United States Patent

Gaddy

[15] 3,636,539

[45] Jan. 18, 1972

[54] OPTIMUM PERFORMANCE SPACECRAFT SOLAR CELL SYSTEM

[72] Inventor: Edward M. Gaddy, Greenbelt, Md.

[73] Assignee: The United States of America as represented by the Administrator of the National Aeronautics and Space Administration

[22] Filed: Nov. 18, 1970

[21] Appl. No.: 90,595

[52] U.S. Cl. ................................340/210, 244/1 SS, 136/89

[51] Int. Cl. ........................................................G08c 19/16

[58] Field of Search ......................307/116, 117, 71; 136/89; 340/210; 244/1 SS, 1 SC; 250/203

[56] References Cited

UNITED STATES PATENTS 3,326,497 6/1967 Michelson ...........................244/1 SS 3,515,594 6/1970 Samuels.................................136/89

*Primary Examiner*—Donald J. Yusko
*Assistant Examiner*—Robert J. Mooney
*Attorney*—R. F. Kempf, E. Levy and John R. Manning

[57] ABSTRACT

A spacecraft solar cell system including a switching circuit which comprises relay operated switches for changing a plurality of solar cells from a first series-parallel interconnection to a second series-parallel interconnection is disclosed. The relays are actuated by a command device which may be a telemetry receiver. A protection circuit comprising a photodiode is connected between the command device and the relays to ensure appropriate solar cell orientation when switching occurs. This prevents arcing across the relay switches.

8 Claims, 1 Drawing Figure

INVENTOR
EDWARD M. GADDY

BY Earl Levy
ATTORNEYS

OPTIMUM PERFORMANCE SPACECRAFT SOLAR CELL SYSTEM

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to the art of spacecraft mounted solar cell arrays and more particularly to solar cell arrays that include means for controlling the performances of such arrays in order to compensate for variations in environmental conditions.

Solar cells, which are arranged on solar cell panels, are often used on spacecraft to generate electrical energy for the spacecraft. One difficulty with using solar cells on spacecraft is that their performance is not constant under varying environmental conditions. For example, if a spacecraft's solar cells cool, the associated optimum solar cell output voltage increases; if a spacecraft's solar cells receive less sun illumination, their current output decreases. In a practical situation, where it is intended that the destination of a spacecraft is Mars, then, as the distance from the sun increases, a spacecraft's solar cells cool and, as a result, an associated optimum solar cell output voltage increases. Simultaneously, sun illumination decreases and the optimum solar cell output current decreases.

Prior art solar cell arrays overcome the above-mentioned variations in performance by being sized to accommodate all of the worst operating conditions for particular flights. For example, in an Earth to Mars mission, enough cells are connected in series to accommodate the relatively high temperatures that occur when the spacecraft is near Earth and enough solar cells are connected in parallel to accommodate the relatively low illumination that occurs when the spacecraft is near Mars. This results in an oversized array with attendant high cost and undue weight.

While some other solutions have been proposed to overcome the difficulty caused by the above-mentioned varying V–I parameters of solar cells, they have been highly sophisticated and have been expensive to manufacture and use.

Therefore, it is an object of this invention to provide a new and improved optimum performance solar cell system.

It is also an object of this invention to provide an optimum performance solar cell system that overcomes the difficulties caused by the varying V–I parameters of solar cells without requiring the use of an excessive number of solar cells.

SUMMARY OF THE INVENTION

According to the principles of this invention, a switching circuit in combination with a solar cell array mounted on panels is provided. The switching circuit switches one series-parallel arrangement of solar cell panels to another arrangement to provide compensation for environmental changes. Such environmental changes may result from a change in the distance between the spacecraft, on which the solar cell panels are mounted, and the sun. More specifically, when a plurality of relay switches are in a first position, a group of solar cell panels are connected in a first series-parallel circuit. When the relay switches are switched to a second position, the solar cell panels are switched to a second series-parallel circuit. A greater number of individual solar cells are connected in series in the first circuit than in the second circuit. The relay switches are actuated by a telemetry operated command device.

In accordance with further principles of this invention, a photosensitive conducting means, that only conducts current when light impinges on its photosensitive surface, is connected between the command device and the relay switches. The photosensitive conducting means is mounted on the opposite side of the spacecraft from the photocells. Thus, the relay switches can only receive a command signal from the command device when the photocells are facing away from the sun. Hence, the relay switches are not overloaded with solar cell current when switching occurs.

BRIEF DESCRIPTION OF THE DRAWINGS

The foregoing and other objects, features and advantages of this invention will become more apparent from the following more particular description of a preferred embodiment of the invention, wherein.

DESCRIPTION OF A PREFERRED EMBODIMENT

Figure 1:
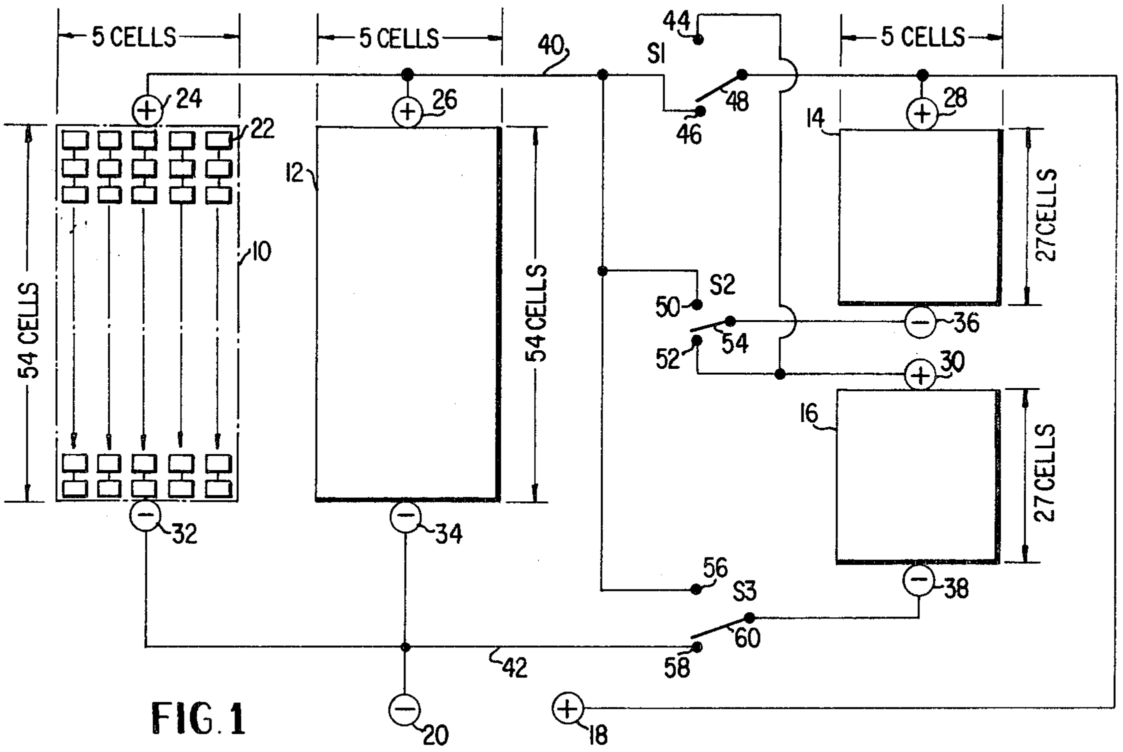
FIG. 1 is a schematic representation of a solar cell panel arrangement and a switching system formed in accordance with this invention; and, FIG. 2 is a diagram of a control system formed in accordance with this invention that is suitable for controlling the operation of the switching system shown in FIG. 1.

Referring now to FIG. 1, there is shown four solar cell panels 10, 12, 14 and 16 suitable for use on a spacecraft. As more fully hereinafter described, the first solar cell panel 10 is connected in parallel with the second solar cell panel 12 and these two solar cell panels are connected through three switches designated $S_1$, $S_2$ and $S_3$ to the third and fourth solar cell panels 14 and 16. The solar cell panels provide a voltage output between a positive terminal 18 and a negative terminal 20.

As is well known in the art, each of the solar cell panels 10, 12, 14 and 16 comprises a series-parallel arrangement of solar cells 22. For ease of illustration, only a few solar cells are shown on the first solar cell panel 10. It can be seen in FIG. 1 that the solar cell panels 10 and 12 comprise five parallel-connected columns of 54 series-connected solar cells. The third and fourth solar cell panels 14 and 16, on the other hand, comprise five parallel-connected columns of 27 series-connected solar cells. The four solar cell panels 10, 12, 14 and 16 have positive terminals 24, 26, 28 and 30, respectively, and negative terminals 32, 34, 36 and 38, respectively.

The first and second solar cell panels 10 and 12 are connected in parallel. That is, the first solar cell positive terminal 24 is connected to the second solar cell positive terminal 26 and both of these terminals are connected to a positive bus 40, and the first solar cell negative terminal 32 and the second solar cell negative terminal 34 are connected to a negative bus 42.

The switches $S_1$, $S_2$ and $S_3$ are all double pole, single throw switches. The first switch $S_1$ has an up pole 44, a down pole 46 and a switch arm 48. The second switch $S_2$ has an up pole 50, a down pole 52 and a switch arm 54. The third switch $S_3$ has an up pole 56, a down pole 58 and a switch arm 60.

The up pole 44 of $S_1$ is connected to the positive terminal 30 of the fourth solar cell panel 16 and the down pole 46 of $S_1$ is connected to the positive bus 40. The switch arm 48 of $S_1$ is connected to the positive terminal 18.

The up pole 50 of $S_2$ is connected to the positive bus 40, and the down pole 52 is connected to the positive terminal 30 of the fourth solar cell panel 16. The switch arm 54 of $S_2$ is connected to the negative terminal 36 of the third solar cell panel 14.

The up pole 56 of $S_3$ is connected to the positive bus 40 and the down pole 58 of $S_3$ is connected to the negative bus 42. The switch arm 60 of $S_3$ is connected to the negative terminal 38 of the fourth solar cell panel 16.

Figure 2:
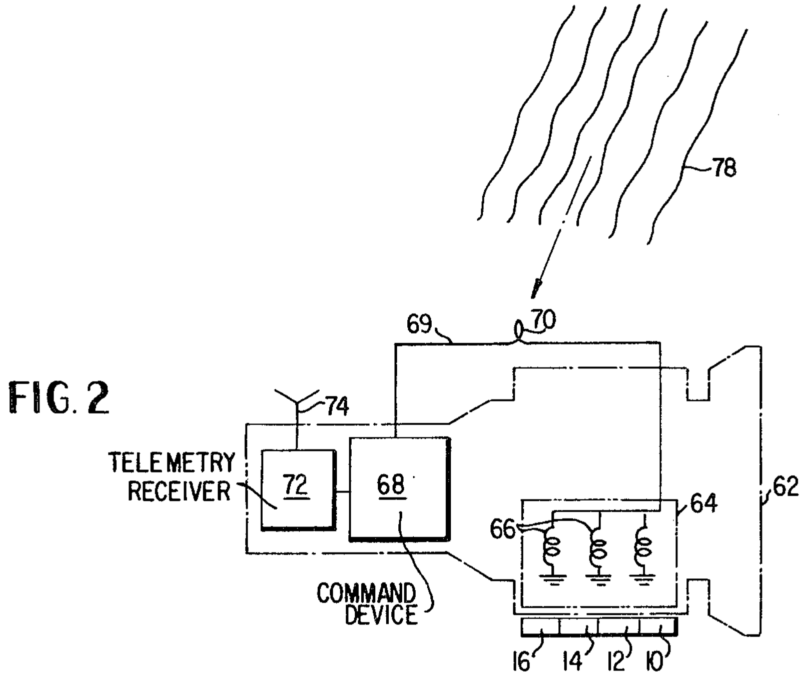

FIG. 2 shows the solar cell panels 10, 12, 14 and 16 mounted on one side of a spacecraft 62. $S_1$, $S_2$ and $S_3$ (not shown in FIG. 2) are enclosed in a switch box 64 and actuated by relay coils 66 also located in the switch box 64. A command device 68 is coupled to the relay coils 66 through a photodiode 70 via a command line 69. It should be particularly noted that the photodiode 70 is mounted on the opposite side of the spacecraft 62 from the solar panels 10, 12, 14 and 16. A telemetry receiver 72, having an antenna 74, is coupled to the command device 68, which upon a command signal being applied thereto from receiver 72, supplies the necessary power, via command line 69 to operate relay coils 66. Light 78, emanating from the sun, impinges on the spacecraft 62 and its associated circuitry.

Turning now to a description of the operation of the apparatus shown in FIGS. 1 and 2, the command device 68, in response to a command signal received by the telemetry receiver 72, energizes the relay coils 66 through photodiode 70 so as to switch $S_1$, $S_2$ and $S_3$ between "up" and "down" positions and thereby change the solar cell arrangement shown in FIG. 1 from a first series-parallel circuit to a second series-parallel circuit.

Describing the operation in more detail, and using a trip from Earth to Mars as an example, when a spacecraft first begins the trip, the solar cells on the solar panels 10, 12, 14 and 16 are relatively warm because of being close to the sun; the cells therefore provide a relatively low voltage. At the same time, because of their closeness to the sun, the cells provide a relatively high current. Because the voltage per cell is low, a large number of cells must be connected in series to achieve the desired voltage. It will be appreciated that because the current is high, this can be done with a limited number of cells without dropping below the desired current level. To accomplish this desired series-parallel arrangement, $S_1$, $S_2$, and $S_3$, shown in FIG. 1, are in their up positions. When $S_1$, $S_2$, and $S_3$ are in their up positions, the third and fourth solar panels 14 and 16 are connected in parallel with one another, and in series with the first and second solar panels 10 and 12. Hence, a relatively large number (81) of solar cells are in series and a relatively low number (10) are in parallel, whereby the voltage is increased without the current decreasing below a desired level.

As the spacecraft travels towards Mars, the distance from the sun increases and the solar cell array on the panels cools. As a result the cell voltages increase until the output from the overall array exceeds a desirable operating voltage. Simultaneously, the sun illumination decreases and the cell currents decrease accordingly.

Either telemetry informs a ground crew that the environmental condition surrounding the spacecraft has changed or the ground crew determines that such a change has occurred because of the location of the spacecraft. In any event, the ground crew transmits a command signal to the telemetry receiver 72. The telemetry receiver, in turn, sends a command signal to the command device. The command device 68 thereupon places a command voltage on the command line 69. The command voltage energizes the relay coils 66, but only when the photodiode 70 has sunlight impinging thereon. Thus, the command voltage signal is not received by the relay coils 66 until the solar panels 10, 12, 14 and 16 are facing away from the sun and the photodiode is facing the sun. This protective arrangement prevents arcing across the contacts of $S_1$, $S_2$ and $S_3$ when they are being switched.

When the photodiode 70 allows the command voltage 69 to pass through to the relay coils 66, the relay coils 66 cause the switch arms 48, 54 and 60 of $S_1$, $S_2$ and $S_3$, respectively, to move from the up position to the down position. When the switches $S_1$, $S_2$ and $S_3$ are in the down position the third and fourth solar panels 14 and 16 are connected in series with one another and in parallel with the first and second solar panels 10 and 12. Hence, the solar panel arrangement shown in FIG. 1 reduces the previous voltage and increases the previous current output at output terminal 18 and 20 to compensate for the change environmental conditions. In this case, 54 cells are now connected in series and 15 are connected in parallel.

Hence, in switching from the first series-parallel circuit to the second series-parallel circuit, a series circuit of 81 solar cells has been reduced to a series circuit of 54 solar cells, and a parallel circuit of 10 solar cells has been increased to a parallel circuit of 15 solar cells.

In this case of a trip from Earth to Venus, opposite conditions exist. That is, as a spacecraft travels toward Venus, the distance to the sun is reduced, and an increase in temperature reduces voltage and increases current. In this situation, switching is performed to change cells from a "more-parallel" configuration to a "more-series" configuration.

In any event, for the case of a constant current load, switching is performed to keep just enough cells in parallel to maintain a desirable operating current, leaving the remainder to be put in series to increase voltage. Where both current and voltage requirements vary, switching is performed so as to have either the number of cells in series follow the voltage or the number of cells in parallel follow the current, leaving the remainder to be put in parallel or series, respectively.

In the above-described example, the switching command signal originated from a ground crew; however, such a command signal can also originate from a condition responsive sensor, such as a solar cell performance sensor or an environment condition sensor if desired. Moreover, by changing the command signal voltage placed on the command line 69 by the command device 68 from one form of voltage to another form, the status for $S_1$, $S_2$ and $S_3$ can be changed at will, as desired. Such an operational embodiment of the invention may be useful on a solar orbiting spacecraft having a large apogee and a small perigee.

The solar cell control circuit of this invention can be used to increase power output whenever the solar cell characteristics change. In the case where the solar cell characteristics change such that the desired (optimum) current increases while the desired (optimum) voltage decreases or vice versa, the switching circuit of this invention is extremely useful. The above-described solar cell switching circuit, reduces the weight and decreases the size of solar cell arrays because less cells are necessary to achieve the desired voltage-current outputs. This results in an attendant reduction in solar cell array costs and also allows for increased availability of weight and space for other items and experiments.

While the invention has been particularly shown and described with reference to a preferred embodiment, it will be understood by those skilled in the art that various changes in form and detail may be made therein without departing from the spirit and scope of the invention. For example, there could be more or fewer solar cell panels than the four which were described. Also, other types of switching means, such as solid state switches could be used with this invention. Hence, this invention can be practiced otherwise than as specifically described herein.

What is claimed is:

1. An optimum performance solar cell system suitable for use on a spacecraft comprising:
   - a plurality of solar cell panels;
   - a plurality of solar cells mounted in predetermined configurations on each of said panels; and,
   - circuit means for interconnecting said solar cell panels, said circuit means including a switching means for switching the interconnections of said solar cell panels from a first electrical interconnection to a second electrical interconnection.

2. An optimum performance solar cell system as claimed in claim 1 wherein there is further included:
   - a relay means, responsive to an electrical signal for actuating said switching means; and,
   - a command means connected to said relay means for providing an electrical signal, to said relay means.

3. An optimum performance solar cell system as claimed in claim 2 wherein there is further included a receiver means connected to said command means for receiving a control signal and applying a signal to said command means.

4. An optimum performance solar cell system as claimed in claim 3 wherein said receiver means is a telemetry receiver.

5. An optimum performance solar cell system as claimed in claim 3 wherein there is further included a photosensitive conducting means connected between said command means and said relay means.

6. An optimum performance solar cell system as claimed in claim 5 wherein said solar cells are mounted on one side of a spacecraft and said photosensitive conducting means is mounted on an opposite side of said spacecraft.

7. An optimum performance solar cell system as claimed in claim 6 wherein said first electrical interconnection is a first series-parallel interconnection and second electrical interconnection is a second series-parallel interconnection.

8. An optimum performance solar cell system as claimed in claim 7 wherein:

said plurality of solar cell panels equals four in number;

said circuit means permanently connects two of said four solar cell panels in parallel; and, said first series-parallel interconnection of said solar cell panels connects said other two solar cell panels of said four solar cell panels in series with one another and in parallel with said first two solar cell panels, and said second series-parallel interconnection of said solar cell panels connects said other two solar cell panels in parallel with one another and in series with said first two solar cell panels.

* * * * *